US007710932B2

(12) United States Patent
Muthuswamy et al.

(10) Patent No.: US 7,710,932 B2
(45) Date of Patent: May 4, 2010

(54) METHOD AND APPARATUS FOR ENCOURAGING ROUTING IN A NETWORK

(75) Inventors: Sivakumar Muthuswamy, Tower Lakes, IL (US); Rajeev Agrawal, Northbrook, IL (US); Yogesh B. Bhatt, Schaumburg, IL (US); Avinash Joshi, Orlando, FL (US); Surender Kumar, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 1175 days.

(21) Appl. No.: 11/302,866

(22) Filed: Dec. 14, 2005

(65) Prior Publication Data
US 2007/0133488 A1    Jun. 14, 2007

(51) Int. Cl.
*H04W 4/00* (2009.01)
(52) U.S. Cl. .................. 370/338; 370/238; 370/238.1; 370/351; 370/355; 370/356; 455/445; 455/41.2; 455/428
(58) Field of Classification Search .......... 455/445, 455/41.2, 428; 370/338, 238, 238.1, 351, 370/355, 356, 395.31
See application file for complete search history.

(56) References Cited

U.S. PATENT DOCUMENTS 7,016,665 B2 * 3/2006 Tamaki et al. ............... 455/406

| | | | |
|---|---|---|---|
| 7,415,268 B2 * | 8/2008 | Trossen ....................... 455/406 |
| 2005/0135379 A1 * | 6/2005 | Callaway et al. .......... 370/395.31 |
| 2005/0165696 A1 | 7/2005 | Jakobsson et al. |
| 2005/0243757 A1 * | 11/2005 | Yagyu et al. ................. 370/328 |
| 2007/0087756 A1 * | 4/2007 | Hoffberg ...................... 455/450 |
| 2007/0280192 A1 * | 12/2007 | Yagyu et al. ................. 370/349 |

OTHER PUBLICATIONS

Stimulating Cooperation in Self-Organizing Mobile Ad Hoc Networks—L. Buttyan et al—ACM Journal for Mobile Networks (MONETS), special issue on Mobile Ad Hoc Networks—Oct. 2003, vol. 8, No. 5. -pp. 579-592.

* cited by examiner

*Primary Examiner*—Joseph H Feild
*Assistant Examiner*—Huy D Nguyen
(74) *Attorney, Agent, or Firm*—Randi L. Karpinia

(57) ABSTRACT

A node (200) includes a processor (201) for determining neighbor nodes in a routing path to a destination based on a routing table associated with the node (200). The node (200) includes a memory for storing a first authenticated tokens. The node includes a transmitter (203) for transmitting a first request-to-route (RTR) message including an indication specifying information units (IUs) from the first node to the neighbor nodes in a routing path from the first node to the destination. The node (200) includes a receiver (205) for receiving a neighbor reply message from one of the neighbor nodes to the first node which indicates that the neighbor node will route the information units (IUs). The transmitter (203) transmits a second authenticated tokens from the first node to one of the neighbor nodes. The second authenticated tokens are converted into a tradable entity and provide compensation to the neighbor node selected.

35 Claims, 10 Drawing Sheets

METHOD AND APPARATUS FOR ENCOURAGING ROUTING IN A NETWORK

FIELD OF THE INVENTION

The present invention relates generally to communications and more particularly to computer networks.

BACKGROUND

Wireless networks have experienced increased development in the past decade. Two types of wireless networks are infra-structured wireless networks, and ad hoc wireless networks.

An infra-structured wireless network typically includes a communication network with fixed and wired gateways. Many infra-structured wireless networks employ a mobile unit or host which communicates with a fixed base station that is coupled to a wired network. The mobile unit can move geographically while it is communicating over a wireless link to the base station. When the mobile unit moves out of range of one base station, it connects or "handsover" to a new base station and starts communicating with the wired network through the new base station.

The wired network typically has a billing manager, such as an authentication, authorization, and accounting (AAA) center, which monitors packet traffic to and from each wireless device. The AAA center provides a framework for intelligently controlling access to communication resources, enforces policies, audits usage, and provides the information necessary to bill for services. The accounting aspect of the AAA center measures the resources a user consumes during access. This can include the amount of system time or the amount of data a user has sent and/or received during a session. Accounting is carried out by logging of session statistics and usage information and is used for authorization control, billing, trend analysis, resource utilization, and capacity planning activities. Among other functions, the AAA center can maintain a count of packets transmitted by a wireless device and then charge the user of the wireless device for use of the network based on the number of packets transmitted.

In comparison to infra-structured wireless networks, such as cellular networks or satellite networks, ad hoc networks are self-forming networks which can operate in the absence of any fixed infrastructure, and in some cases the ad hoc network is formed entirely of mobile nodes (e.g., a peer-to-peer ad hoc network). An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infra-structured or wired network. Ad hoc networks can also be self-healing. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a fixed infrastructure (e.g., a central controller), many network-controlling functions can be distributed among the nodes such that the nodes can self-organize and reconfigure in response to topology changes.

One characteristic of the nodes is that their transmission range is usually relatively limited in comparison to cellular networks. Each node can typically communicate over a short range with nodes which are a single "hop" away. Such nodes are sometimes referred to as "neighbor nodes." Because ad hoc networks lack infrastructure, each node in an ad hoc network relies on other nodes in the network to help to forward/route/relay its packets (e.g., data and control information) throughout the network until the packets reach their intended destination. For example, when a node transmits packets to a destination node and the nodes are separated by more than one hop (e.g., the distance between two nodes exceeds the radio transmission range of the nodes, or a physical barrier is present between the nodes), the packets can be relayed via intermediate nodes ("hop-by-hop") until the packets reach the destination node. Each intermediate node acts as a router which can intelligently route the packets (e.g., data and control information) to another node until the packets eventually reach their final destination. For instance, if the destination is a user connected to the Internet, packets sent from a source node to that user will "hop" or be routed by intermediate nodes until they reach a cellular base station, a WLAN AP or other gateway to the Internet.

To assist with relaying of packets, each node maintains routes or routing information to other nodes in the network and can utilize routing techniques to adapt to changes in the interconnectivity between nodes. The nodes can maintain this routing information by performing periodic link and topology updates. In this context it is desirable to provide techniques which maximize the robustness of the routing topology for the maximum period of time to enable uninterrupted communication.

When a node routes a packet sent from another node, this routing consumes the bandwidth and battery resources of the node which performs the routing function. Published U.S. Patent Application US20050165696A1, entitled "Micro-Payment Scheme Encouraging Collaboration In Multi-Hop Cellular Networks," and an article by L. Buttyan et al., "Stimulating Cooperation in Self-Organizing Mobile Ad Hoc Networks," ACM Journal for Mobile Networks (MONET), special issue on Mobile Ad Hoc Networks, October 2003, Vol. 8, No. 5, propose micro payment and bit credit/debit schemes that provide accounting techniques for packet routing. According to these techniques, a billing system, in the cellular core (wired) network, uses credits/debits to account for packets routed by a particular node for other nodes in its ad hoc network. However, these credits/debits provide little or no incentive to the owner of a particular node to route traffic (e.g., packets) to/from another node within their ad hoc network.

Notwithstanding these advances, techniques are needed to encourage nodes to perform a routing function to assist other nodes in routing packets throughout an ad hoc network. It would be desirable to provide techniques which can provide an incentive for nodes to route packets for other nodes.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
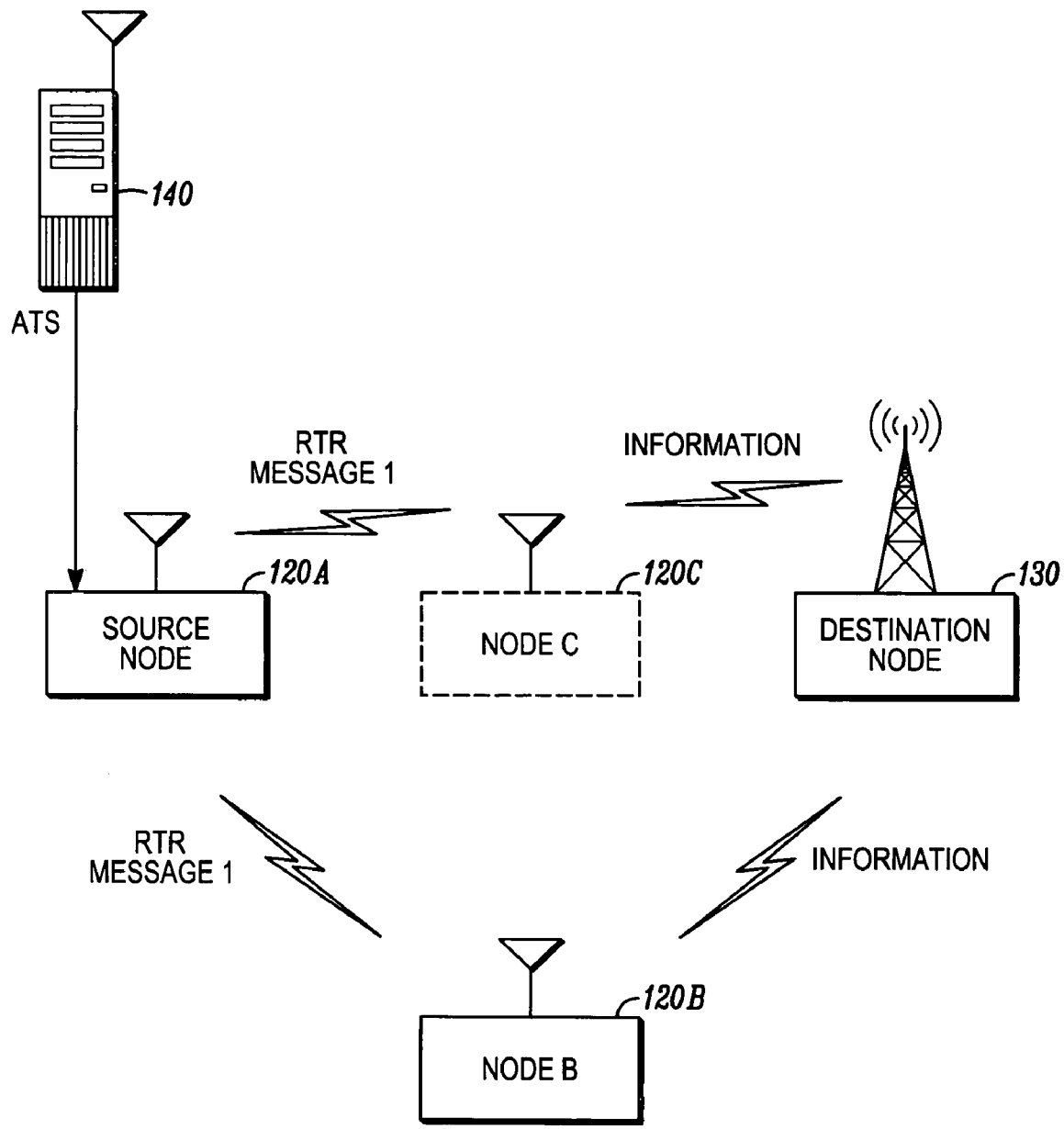
FIG. 1A is a block diagram of an exemplary peer-to-peer ad hoc communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to techniques for encouraging information routing in an ad hoc network comprising a plurality of nodes. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method for encouraging information routing in an ad hoc network comprising a plurality of nodes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

FIG. 1A is a block diagram of an exemplary ad hoc communication network 100. The ad hoc communication network 100 comprises a plurality of nodes 120A-120C, one or more optional access points (APs) 130 and a token manager (TM) 140. The access points 130 may be a cellular base station, a wireless access point that complies with the IEEE 802.11 Standard or other WLAN (wireless local area network) Standards, or may also be a Bluetooth access point, or the like. It should be appreciated that FIG. 1A is a simplified representation of an ad hoc network 100, and in reality the ad hoc network could include other nodes, such as intermediate nodes, between node B 120B, node C 120C and destination node I 130.

The nodes 120A-120C are wireless devices capable of receiving and transmitting packetized audio, video and/or data information. Some of the components in an exemplary node, such as an appropriate processor, transmitter, receiver and antenna, are described below with reference to FIG. 2. The nodes 120A-120C can communicate information packets over wireless carrier frequencies, each of which includes one or more wireless communication channels depending on the multiple access scheme utilized in the network 100. The nodes 120A-120C each have wireless repeater and routing capability. Communications to or from nodes 120A-120C can "hop" through each other to reach other nodes 120A-120C in the network. Nodes in close proximity to the APs 130 can receive transmissions from other nodes utilizing the ad hoc air interface and relay these transmissions to infrastructure equipment via uplink communication signal utilizing a cellular, Bluetooth or WLAN air interface. Similarly, nodes in close proximity to the APs 130 can receive downlink communications over the cellular, Bluetooth or WLAN air interface and transmit uplink communications to another node via the ad hoc air interface.

The access points 130 are typically coupled to a wired network (not shown) and can provide one or more sources of audio, video and/or data information.

A wireless network is created between a plurality of nodes 120A-120C and among wired Access Points (APs) 130 and the nodes 120A-120C. The nodes can move seamlessly between infrastructure-based networks and client-based peer-to-peer networks. The ad hoc communication network 100 can implement routing intelligence which can distribute nodes 120A-120C among APs 130 to help eliminate bottlenecks and improve overall network performance. Nodes 120A-120C can hop to alternate APs if their current AP is congested or fails. It should be appreciated that while the ad hoc network 100 in FIG. 1A is shown as operating in an infra-structured mode, the ad hoc network 100 of FIG. 1A does not require any network infrastructure to be present. Rather, the nodes 120A-120C typically support simultaneous operation in both infrastructureless mode and infra-structured mode.

Although not shown in FIG. 1A, it should be appreciated that the nodes 120A-120C, can also communicate information packets with a cellular-based network (not shown) over wireless carrier frequencies, each of which includes one or more wireless communication channels depending on the multiple access scheme utilized in the cellular-based network. Examples of multiple access schemes which used in the network can include any one or more of time division multiple access (TDMA), direct sequence or frequency hopping code division multiple access (CDMA), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

Each node 120A-120C can advertise its presence by periodically broadcasting for an advertisement message. In response to the advertisement message, other nodes within range can acknowledge their presence by identifying themselves. In turn, each node can identify its neighbor nodes, and maintain a neighbor list of nodes in proximity to that node. As used herein, a "neighbor node" is a node which is one hop away from the node such that the nodes may communicate with each other. A particular node's neighbor list changes dynamically as the topology of the network changes. At the particular instant in time shown in FIG. 1A, node A 120A has two neighbor nodes—node B 120B and node C 120C.

When a node B 120B receives a packet, node B 120B determines whether the received packet is a unicast or broadcast packet. If the received packet is a unicast packet, then node B 120B transmits the packet to the neighboring node, such as destination node I 130, that the packet is addressed to or intended for. If the received packet is a broadcast packet, then node B 120B transmits the received broadcast packet to each of its neighbor nodes.

In this example, it is assumed that node A 120 A wants to transmit a number of information units (IUs) to a destination node I 130. As such, node A 120A can be referred to as a "source" node. The terms "source" and "destination" are not used in a restrictive sense, but merely to distinguish between two nodes and illustrate an example of how aspects of the invention can be applied in certain systems. The terms "source" and "destination" can be used interchangeably.

The information units can be, for example, a number of bits, bytes, packets or frames of data and/or control/signaling information. To accomplish this, node A 120A must transmit the IUs to one of its neighbor nodes which can then relay the IUs to one of their neighbor nodes (not shown), etc., until the IUs reach the destination node I 130.

The credits/debits used in the accounting techniques described in the background section provide little or no incentive to the owner of a particular node to route traffic (e.g., packets) to/from another node within their ad hoc network since these techniques do not provide a mechanism which allows the owner to translate these credits and debits into something tangible, such as currency, a tradable entity or other reward.

The embodiments described below provide techniques for converting credits/debits into a tangible return (e.g., currency or other tangible property) so that the owner of the node performing the routing function has a concrete incentive (or is compensated) for performing the routing function. These techniques can be used to maintain a high level of connectivity in ad hoc networks formed by a group of disparate nodes which otherwise lack an incentive to route packets for other nodes in the ad hoc network.

In one embodiment, each node or node in an ad hoc network will credit certain number of credits or tokens for routing other nodes packets/bits (both control and data). The number of tokens credited or debited can depend on a fixed exchange rate that is agreed upon before the transaction starts. The exchange rate could be tied to Ebay type auctioning model and could depend upon the criticality of the routing node to completing the path. For example, if the node that is agreeing to route the packets is the only one that can complete the connection to an access point or to another desired destination node, the node may demand more tokens in exchange for routing the packets. According to an embodiment of the invention, a central token management authority (similar to VeriSign™) issues authenticated tokens to each of the nodes. Each of the nodes can charge/download authenticated tokens from the token authority over the air, while the node is communicating through a WAN system such as a cellular network or through traditional wired network while the node is placed in a charging/sync cradle. Once the node has these tokens, they can be transacted for routing packets in an ad hoc network. At any point in time, the node can convert the accumulated tokens into a tangible entity such as cash by connecting back to the token authority and submitting the tokens.

Referring again to FIG. 1A, the token manager (TM) 140 can serve as a central token management authority which issues and downloads authenticated tokens to any of the nodes 120. The TM 140 can warranty/vouch for the authenticity of the tokens. The TM 140 can be implemented at an Internet server, at an exchange terminal, such as an ATM terminal, or at other entities such as other server(s) which distribute, issue and/or provide authenticated tokens to nodes. In the exemplary embodiment shown in FIG. 1A, the TM 140 can provide a first number of authenticated tokens to the source node 120A. In essence, the TM can serve as a central authority and vendor of valid authenticated tokens. The TM can also convert those tokens into currency or other tangible property so that the owner of the node performing the routing function has a concrete incentive (or is compensated) for performing the routing function.

In one implementation, the source node 120A can charge/download authenticated tokens from the TM 140 over the air, while the node 120A is communicating through a WAN system such as a cellular network or through traditional wired network while the node 120A is placed in a charging/sync cradle. For example, the user of the source node 120A can purchase the authenticated tokens from the token manager 140 by depositing cash at the TM 140 or by authorizing the TM 140 to bill an account to which the user has access (e.g., the source node 120A can give TM 140 a credit/debit card and in exchange the TM 140 gives the node 120A a number of authenticated tokens in exchange for money transferred from the credit/debit card). Alternatively, the source node 120A could maintain a debit/credit account with the TM 140, and the TM 140 can issue and downloads ATs to the source node 120A in exchange for currency. In one implementation, the source node 120A can download the authenticated tokens from the TM 140 and then store them for future use. Once the node 120A has the authenticated tokens, they can be transacted for routing packets in the ad hoc network 100. When a node uploads ATs to the TM 140 or other exchange terminal, the TM 140 can credit the node with currency. The TM 140 can charge a certain amount of revenue per transaction similar to services such as VeriSign™, PayPal™ or Mastercard™, etc. Providing an authenticated token system with a centralized token management authority (e.g., the TM 140), helps maintain route stability in the ad hoc network 100.

When the source node 120A wants to transmit packets to a destination through any intermediate neighbor nodes, the source node 120A determines which neighbor nodes 120 reside in a routing path to a destination node I 130 based on a routing table associated with the source node 120A. The source node 120A then transmits a first request-to-route (RTR) message to the neighbor nodes in its vicinity which are also in a routing path from the source node 120A to the destination node I 130 (e.g., neighbor node B 120B and neighbor node 120C). At a minimum, the RTR message comprises an indication specifying the number of information units (IUs) which the source node 120A wants to transmit.

The first request-to-route (RTR) message can include a routing transaction proposal which can include an information size field comprising the number of information units (IUs) to be routed, and a compensation-for-routing (CFR) field comprising another number of authenticated tokens to be given by the source node 120A to one of the neighbor node B 120B and neighbor node 120C in exchange for routing the number of information units (IUs). The authenticated tokens provide an incentive to the neighbor node B 120B and neighbor node 120C to route the number of information units.

It should be appreciated that peer-to-peer ad hoc communication network 100 shown in FIG. 1A is a simplified representation in which there are only two intermediate nodes (i.e., Node B 120 B and Node C 120C) between the source node 120A and destination node 130 and in which both Node B 120 B and Node C 120C are a single hop from the destination node 130. In many practical implementations, there are more than two intermediate nodes between the source node 120A and destination node 130. Moreover, in many cases the source node 120A will be more than one hop away from the destination node 130, and there may be many possible routing paths between the source node 120A and destination node 130. An example of such a peer-to-peer ad hoc communication network 110 is shown in FIG. 1B.

Figure 1B:
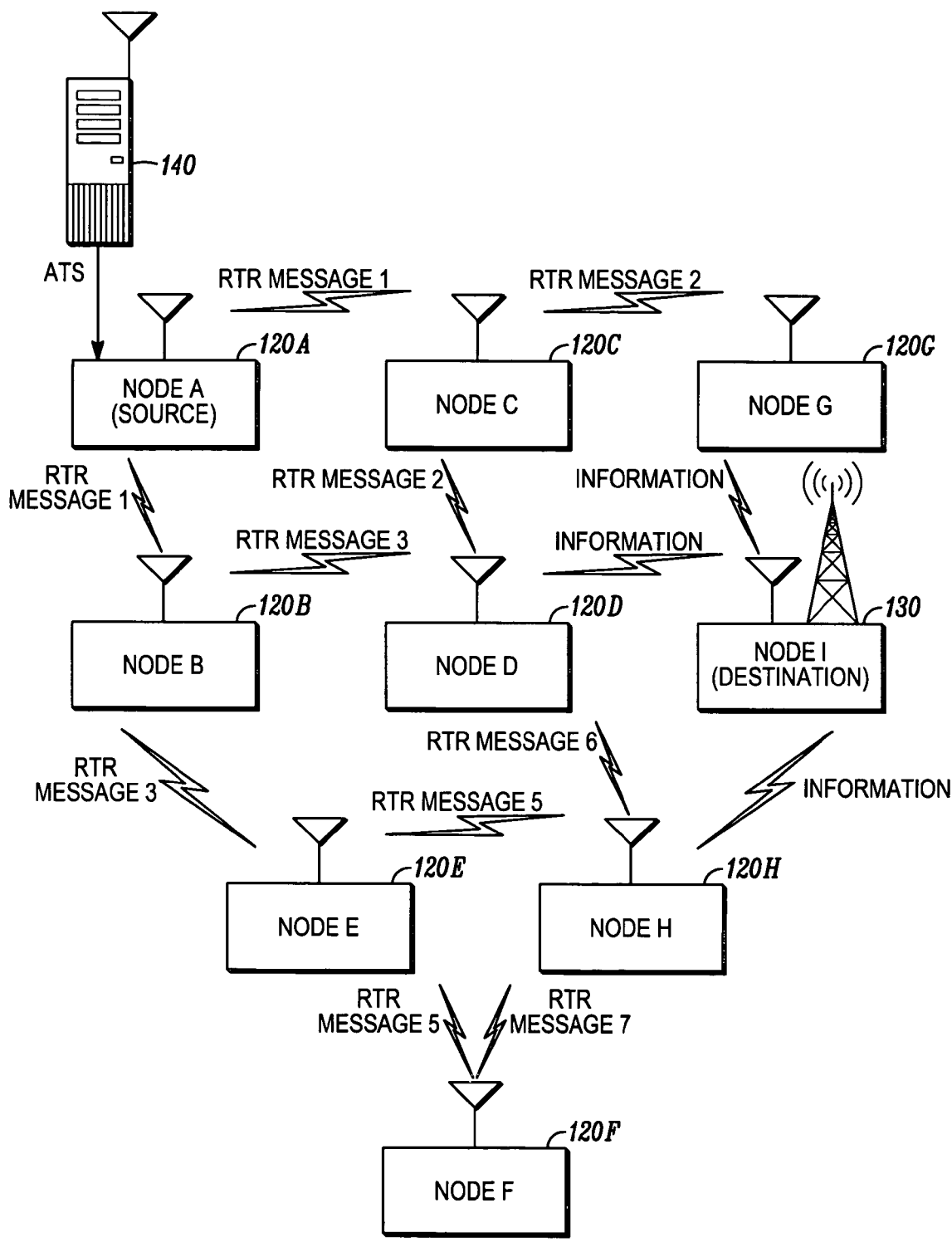
FIG. 1B is a block diagram of another exemplary peer-to-peer ad hoc communication network.

FIG. 1B is a block diagram of another exemplary peer-to-peer ad hoc communication network 110. In this example, there are more than seven intermediate nodes (Node B 120B through Node H 120H) between the source node 120A and destination node 130. There are many possible routing paths between the source node 120A and destination node 130 (e.g., there are at least seven different routing paths shown (ACGI, ACDI, ACDHI, ABEFGI, ABEHI, ABDI, ABDHI)). The source node 120A is more than one hop away from the destination node 130.

Whether or not a given neighbor node 120B, 120C (or group of neighbor nodes) agrees to relay/route the IUs for the source node 120A can be determined by a number of different protocols as will be described with reference to FIGS. 3-9. Prior to discussing these different protocols, a brief explanation of an exemplary node 200 will be provided with reference to FIG. 2.

Figure 2:
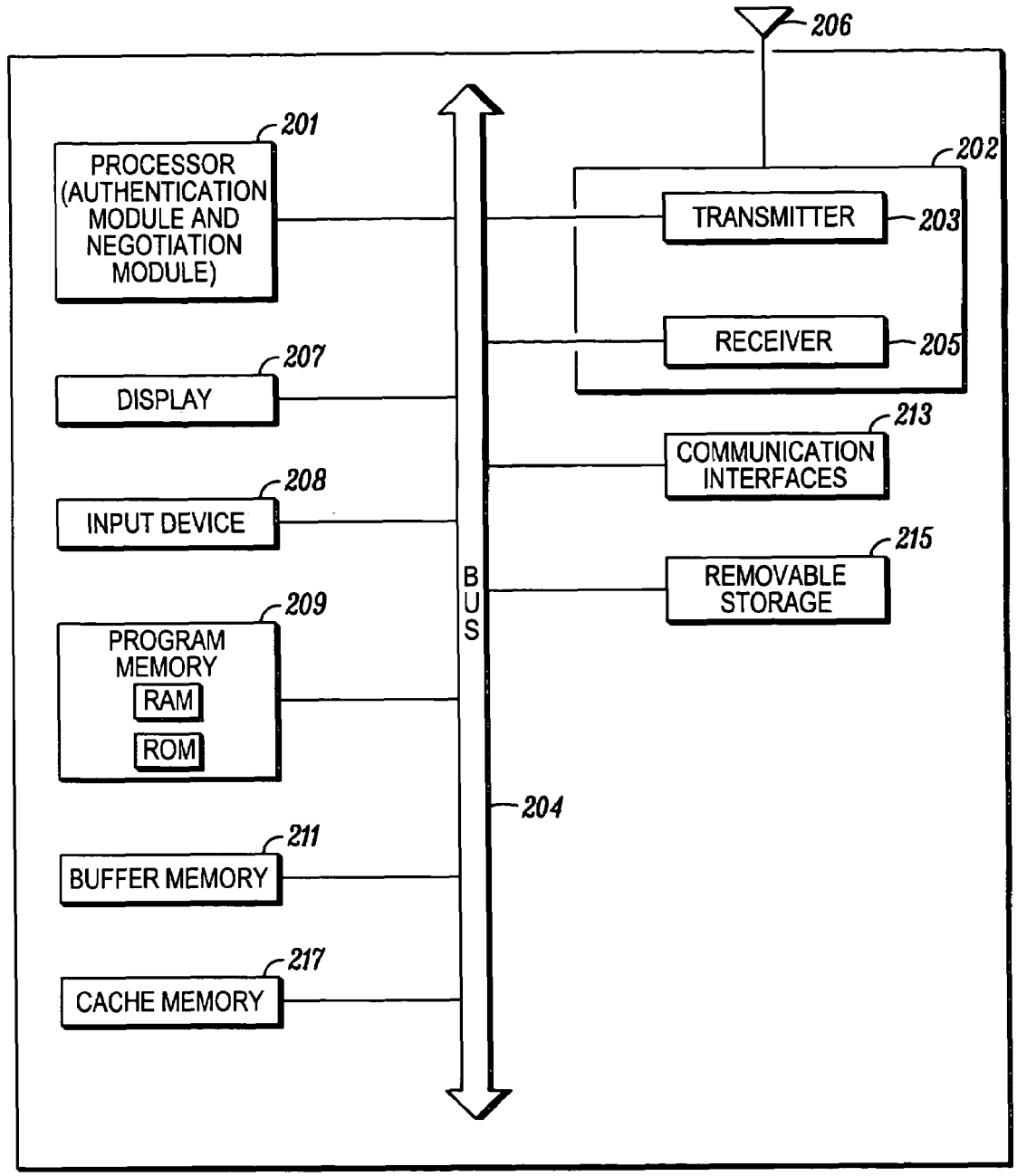
FIG. 2 is a block diagram of an exemplary node in accordance with some embodiments of the invention.

FIG. 2 is a block diagram of an exemplary node 200 in accordance with some embodiments of the invention. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, a removable storage 215 and a cache memory 217. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular electronic function. Alternatively, the node 200 may comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 preferably includes one or more microprocessors, microcontrollers, DSPs (digital signal processors), state machines, logic circuitry, or any other device or devices that process information based on operational or programming instructions.

Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. Among numerous other functions, the processor 201 can determine neighbor nodes in a routing path to a destination based on a routing table associated with the node. In some implementations, the processor 201 can include accounting software/hardware that securely manages and exchanges authenticated tokens and a negotiation module which can be used to negotiate the number of tokens to be exchanged for routing the number of information units (IUs). The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include appropriate, conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wideband CDMA (WCDMA), Universal Mobile Telecommunications System (UMTS), and the like) and an ad hoc networking air interface (e.g., BLUETOOTH, 802.11 WLAN, wireless fidelity' (WiFi), WiMax, and the like) Typically the cellular air interface (utilizing a cellular over-the-air protocol) is used for relatively long-range communication, while the ad hoc air interface (utilizing an ad hoc over-the-air protocol) is used for relatively shorter-range communication.

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless RF modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. One of ordinary skill in the art will recognize that most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving RF signals from at least one bandwidth and optionally more bandwidths, if the communications with the proximate device are in a frequency band other than that of the network communications. The receiver circuitry 205 may optionally comprise a first receiver and a second receiver, or one receiver capable of receiving in two or more bandwidths. The receiver 205, depending on the mode of operation, may be attuned to receive, for example, Public Land Mobile Radio System (PLMRS), Advanced Mobile Phone Service (AMPS), GSM, CDMA, UMTS, WCDMA, Bluetooth, WLAN, such as 802.11, communication signals. The transceiver 202 includes at least one set of transmitter circuitry 203. The at least one transmitter 203 may be capable of transmitting to multiple devices potentially on multiple frequency bands. As with the receiver 205, dual transmitters 203 may optionally be employed where one transmitter is for the transmission to a proximate node or direct link establishment to WLAN's and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the node 200 is constructed to receive video information from a video source, the node 200 preferably further includes a video decoder capable of decoding the current Moving Picture Experts Group (MPEG) standard or some other video decoding standard. When the node 200 is further capable of transmitting video information, the node 200 preferably further includes a video encoder capable of encoding the video data into at least one of the foregoing video standards. Such video encoder and decoder is preferably implemented as part of the processor 201.

The cache memory 217 can temporarily store authenticated tokens which the node purchases from the TM 140. The node can offer some of the authenticated tokens to neighbor nodes as an incentive for the neighbor nodes to route information units the node wants to transmit.

Among numerous other functions, the transmitter circuitry 203 can transmit a request-to-route (RTR) message, generated by the processor 201, to the neighbor nodes in a routing path to a destination. The RTR message minimally comprises an indication specifying a number of information units (IUs) to be routed which can be specified in an information size field. The RTR message may optionally include a compensation-for-routing (CFR) field specifying a number of authenticated tokens to be given to one of the neighbor nodes in exchange for routing the number of information units (IUs).

Among numerous other functions, the receiver circuitry 205 can receive various communications from neighbor nodes. For example, the receiver circuitry 205 can receive counteroffer messages from the neighbor nodes which specify requests for a different number of authenticated tokens in exchange for routing the number of information units (IUs).

The receiver circuitry 205 can also receive bid messages from the neighbor nodes in response to the RTR message. Each bid message comprises a proposed number of authenticated tokens requested by the neighbor node in exchange for routing the number of information units. The processor 101 can evaluate these bid messages, and select the one of the neighbor nodes to route the number of information units.

The receiver circuitry 205 can also receive a neighbor reply message from at least one of the neighbor nodes which indicates that the neighbor node will route the number of information units (IUs). In this case, the processor instructs the transmitter 203 can transmit a number of the authenticated tokens to the neighbor node which transmits the neighbor reply message. The authenticated tokens can be converted into a tradable entity and provide compensation to the neighbor node selected to route the number of information units.

For sake of simplicity, the following discussion of FIGS. 3-9 takes place in the context of FIG. 1A and therefore assumes that that peer-to-peer ad hoc communication network only has (at most) two intermediate nodes between the source node 120A and destination node 130, and further that both of the intermediate nodes (Node B 120 B and Node C 120C) are a single hop from the destination node 130. However, it should be appreciated that in FIGS. 3, 5 and 6, Neighbor Node B can represent either a single intermediate node between Node A (Source) and Node I (Destination) or a plurality of intermediate nodes in a given routing path between Node A (Source) and Node I (Destination). For example, in FIG. 3, it can be assumed that Neighbor Node B 320A represents a plurality of intermediate nodes in a given routing path between Node A (Source) and Node I (Destination). Similarly, Neighbor Nodes B and C in FIGS. 8 and 9 can each represent either a single intermediate node OR a plurality of intermediate nodes in a given routing path between Node A (Source) and Node I (Destination). In other words, nodes B and C could represent either different nodes or different routing paths.

Figure 3:
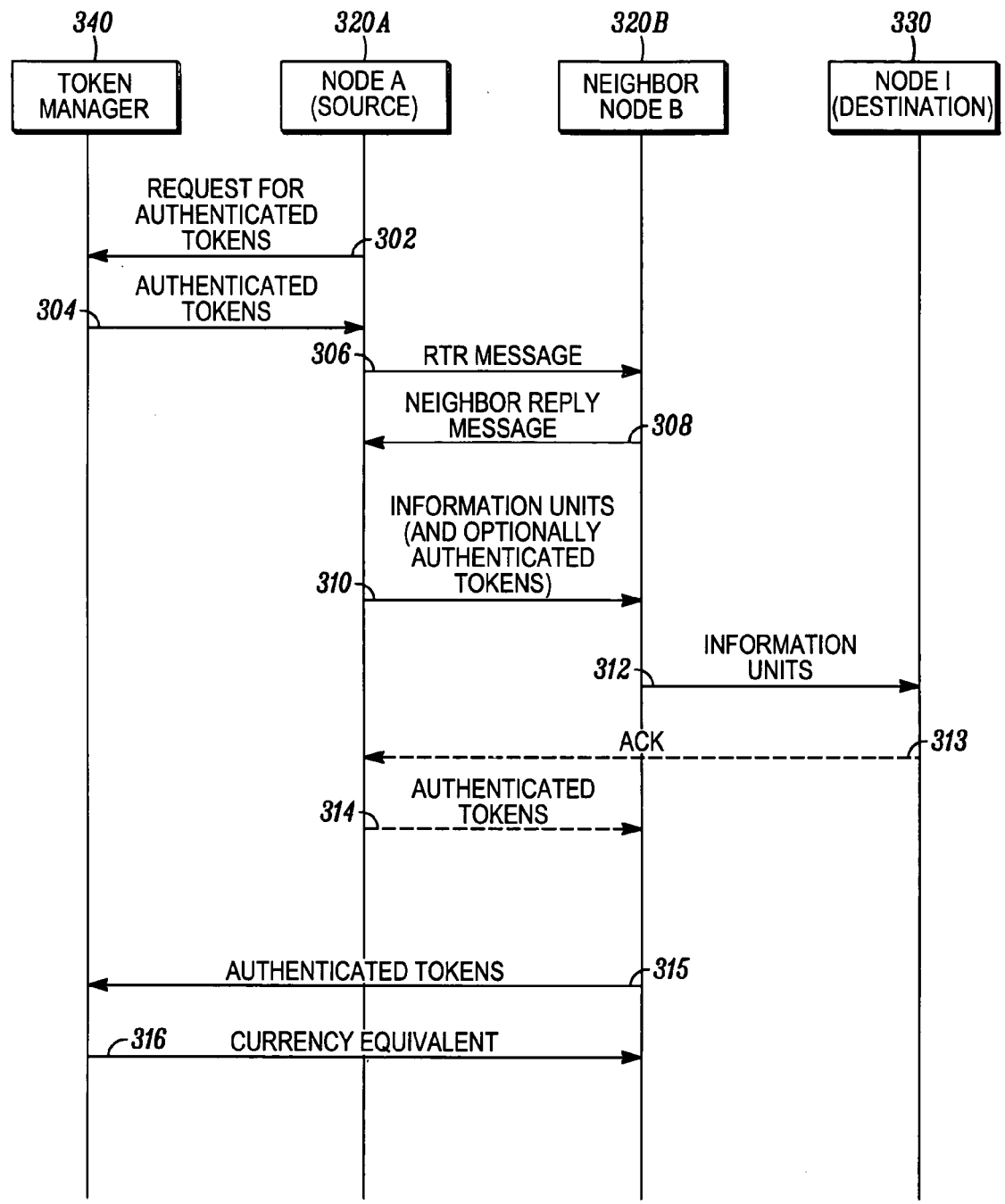
FIG. 3 is an exemplary call flow diagram in accordance with some embodiments of the invention.

FIG. 3 is an exemplary call flow diagram 300 in accordance with some embodiments of the invention.

For example, the node can transmit a request-to-route (RTR) offer message when it seeks to transmit information. The RTR offer message may comprise an information size field comprising the amount of the information to be routed, and a compensation-for-routing (CFR) field comprising a number of the authenticated tokens to be given by the node to one of the neighbor nodes in exchange for transmitting the information.

When the node wants to transmit information (e.g., data or signaling information), the node examines its routing table to determine paths to a given destination such as another node, an WLAN access point or cellular base station. Once the node determines neighbor nodes in this routing path, the node can propose a routing transaction to nodes (e.g., offer a certain number of authenticated tokens) to the neighbor node(s) in the routing path in exchange for routing a given quantity of information. Routing transaction can be, for example, an agreement to route a number of information units (IUs) for a number of authenticated tokens (ATs). Neighbor node can agree to perform a routing transaction for the node. Once the neighbor node performs the routing transaction, it can redeem the ATs it has received/obtained at the TM or other exchange terminal. The ATs can be redeemed for currency or another form of tangible property.

At step 302, an originating node 320A which wants to transmit information units in an ad hoc network transmits a request for authenticated tokens to a token manager 340. This request is typically accompanied with some form of payment such as a debit or credit card number to pay for the authenticated tokens. At step 304, the token manager 340 can then transmit the authenticated tokens to the originating node 320A.

Figure 4:
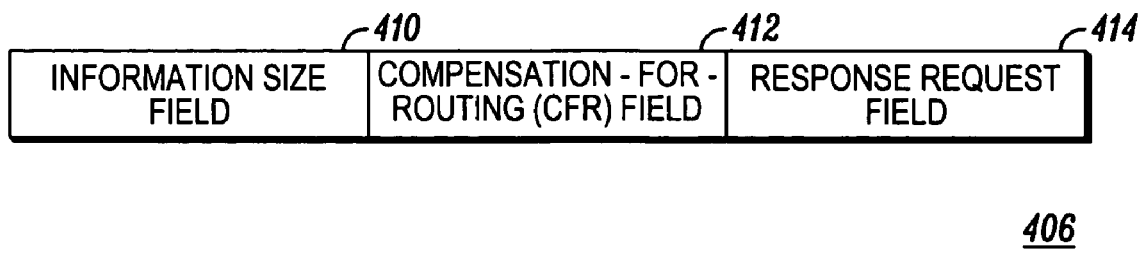
FIG. 4 is a request-to-route (RTR) message in accordance with some embodiments of the invention.

At step 306, the originating node 320A can transmit a request-to-route (RTR) message to its neighbor nodes which in this case are node B 320B. The RTR message can include a number of information units the originating node 320A wants to transmit and a number of authenticated tokens the originating node 320A is willing to pay the neighbor node 320B in exchange for routing the number of information units to the destination node 330. FIG. 4 is a request-to-route (RTR) message 406 in accordance with some embodiments of the invention. In this implementation, the RTR message 406 includes an information size field 410 which specifies the number of information units to be relayed, a compensation-for-routing (CFR) field 412 which specifies the number of authenticated tokens offered in exchange for routing the number of information units, and a response request field 414 which can include, for example, an indication that neighbor nodes should respond if interested in routing/relaying the IUs.

If in FIG. 3 it is assumed that Neighbor Node B 320B represents a plurality of intermediate nodes or a given routing path between Node A (Source) 320A and Node I (Destination) 330, then source node A 320A could simply determine the number of tokens it would like to exchange for routing the information units to destination node I 330, and divide this number of tokens by the number of nodes in the particular routing path to arrive at a scaled number of tokens to be offered to each node in the path. Source node A 320A could then transmit this scaled number as part of its RTR message. This way the number of tokens (exchanged for routing the information units) can be distributed among the nodes in the routing path. If a fixed exchange rate is assumed among nodes in the network, then each node in the routing path could be given a fair percentage of the tokens (e.g., if there are 3 intermediate nodes, then they each get ⅓).

In response to the RTR message, node B 320B can transmit a neighbor reply message at step 308 which indicates whether or not the neighbor node 320B is willing to relay the number of information units in exchange for the number of authenticated tokens proposed by the originating node 320A. In this example, it is assumed that the neighbor node 320B is willing to relay the number of information units in exchange for the number of authenticated tokens proposed by the originating node 320A, and therefore at step 308 the neighbor node 320B can transmit a neighbor reply message indicating that that neighbor node 320B will relay the number of information units. Alternatively, the exchange rate could be negotiated in advance for all nodes. In this case, a neighbor reply message from node B indicates that node B is the first neighbor node to respond and "wins" the right to relay the IUs.

In response to the neighbor reply message, at step 310, the originating node 320A can transmit the number information units to the neighbor node 320B and optionally the number of authenticated tokens. Alternatively, the originating node 320A can wait until it receives an acknowledgment (ACK) message from the destination node 330 at step 313 before transmitting the number of authenticated tokens. The acknowledgment (ACK) message confirms that the destination node 330 received the IUs (e.g., that the neighbor node 320B relayed the IUs to the destination node 330).

At step 312, the neighbor node 320B can transmit or relay the number IUs to the destination node 330. At step 313, the originating node 320A receives an acknowledgment (ACK) message from the destination node 330. The acknowledgment (ACK) message confirms that the destination node 330 received the IUs (e.g., that the neighbor node 320B relayed the IUs to the destination node 330). In response to the ACK message, at step 314, the originating node 320A can transmit the number of authenticated tokens to the neighbor node 320B.

At step 315, the neighbor node 320B can submit the number of authenticated tokens, which it received in exchange for routing the number of information units, to the token manager 340. At step 316, the token manager 340 can transmit a currency equivalent credit to the neighbor node 320C which the neighbor node 320C can later convert to cash.

Figure 5:
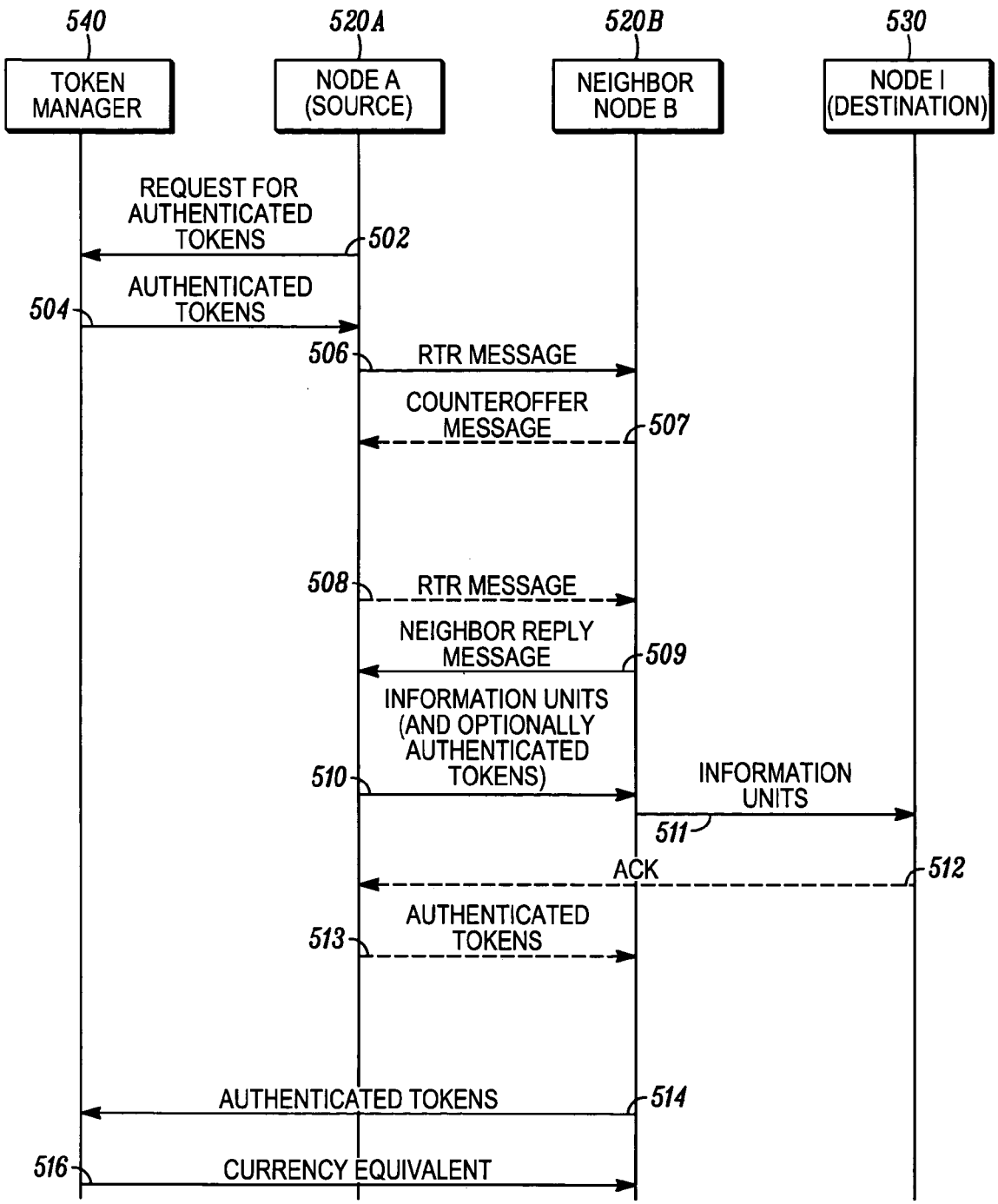
FIG. 5 is an exemplary call flow diagram in accordance with some embodiments of the invention.

FIG. 5 is an exemplary call flow diagram 500 in accordance with some embodiments of the invention.

At step 502, an originating node 520A which wants to transmit information units in an ad hoc network transmits a request for authenticated tokens to a token manager 540. This request is typically accompanied with some form of payment such as a debit or credit card number to pay for the authenticated tokens. At step 504, the token manager 540 can then transmit the authenticated tokens to the originating node 520A.

At step 506, the originating node 520A can transmit a request-to-route (RTR) message to its neighbor nodes which in this case is node B 540B. The RTR message can include a number of information units the originating node 520A wants to transmit. In this implementation, the RTR message 406 includes an information size field 410 which specifies the number of information units to be relayed, a compensation-for-routing (CFR) field 412 which specifies the number of authenticated tokens offered in exchange for routing the number of information units. Each node is provided with negotiation functionality that provides the ability to negotiate routing transactions. Each node can negotiate a number of information units (bits, bytes, packets, frames) to be routed per authenticated token that the neighbor node will be given or receive for routing the information.

Therefore, in response to the RTR message, if node B 540B determines that the number of authenticated tokens proposed by the originating node 520A is adequate then the process skips steps 507 and 508, and at step 509 node B 540B can transmit a neighbor reply message indicating that that neighbor node B 520B will relay the number of information units.

By contrast, if node B 540B determines that the number of authenticated tokens proposed by the originating node 520A is inadequate, then node B 540B can transmit a counteroffer message at step 507 which indicates a different number of authenticated tokens the node B 540B would like to request from the originating node 520A in exchange for routing the number of IUs.

If in FIG. 5 it is assumed that Neighbor Node B 520B represents a plurality of intermediate nodes or a given routing path between Node A (Source) 520A and Node I (Destination) 530, then source node A 520A could simply determine the number of tokens it would like to exchange for routing the information units to destination node I 530, and divide this number of tokens by the number of nodes in the particular routing path to arrive at a scaled number of tokens to be offered to each node in the path. Source node A 520A could then transmit this scaled number as part of its RTR message.

In some cases each particular routing transaction is negotiated between the source and intermediate node(s) in the routing path to a Node I (Destination). For example, in the scenario shown in FIG. 5, if Neighbor Node B 520B represents a plurality of intermediate nodes in a given routing path between Node A (Source) 520A and Node I (Destination) 530, then the nodes in the routing path could each specify the number of tokens they would be willing to accept to participate in a given routing transaction and the aggregate number of tokens could be transmitted as part of counteroffer message 507 or a series of separate counteroffer messages 507. If the aggregate number is acceptable to the source node A 520A, then the negotiation is complete. the approach described above can be used. This way you eliminate the problem of having a source node and only one of the intermediate nodes negotiate on behalf of other intermediate nodes (that are then obligated to route information units without the benefit of having participated in the negotiation).

Returning to FIG. 5, if the originating node 520A deems the counteroffer message acceptable, the process skips forward to step 510. On the other hand, if the originating node 520A does not deem the number of authenticated tokens proposed in the counteroffer message to be acceptable, then the process advances to step 508 where the originating node 520A can transmit a second request-to-route (RTR) message to neighbor node B 520B. It should be appreciated that new nodes could become neighbor nodes during the negotiation process. The second RTR message can include a number of information units the originating node 520A wants to transmit as well as a second number of authenticated tokens the originating node 520A is willing to pay for one of the neighbors.

In this example, it is assumed that the neighbor node 520B is willing to relay the number of information units in exchange for the number of authenticated tokens proposed by the originating node 520A. As such, at step 509, the neighbor node 520B can transmit a neighbor reply message indicating that that neighbor node 520B will relay the number of information units in exchange for the second number of authenticated tokens proposed by the originating node 520A.

In response to the neighbor reply message, at step 510, the originating node 520A can transmit the number information units to the neighbor node B 520B and optionally the number of authenticated tokens. Alternatively, the originating node 520A can wait until it receives an acknowledgment (ACK) message from the destination node 530 at step 512 before transmitting the number of authenticated tokens. The acknowledgment (ACK) message confirms that the destination node 530 received the IUs (e.g., that the neighbor node 520B relayed the IUs to the destination node 530).

At step 511, the neighbor node B 520B can transmit or relay the number information units to the destination node 530. At step 512, the originating node 520A receives an acknowledgment (ACK) message from the destination node 530. The acknowledgment (ACK) message confirms that the destination node 530 received the IUs (e.g., that the neighbor node 520B relayed the IUs to the destination node 530). In response to the ACK message, at step 513, the originating node 520A can transmit the number of authenticated tokens to the neighbor node 520B.

At step 514, the neighbor node 520B can submit the authenticated tokens, which it received in exchange for routing the number of information units, to the token manager 540. At step 516, the token manager 540 can transmit a currency equivalent credit to the neighbor node 520B which the neighbor node 520B can later convert to cash.

Figure 6:
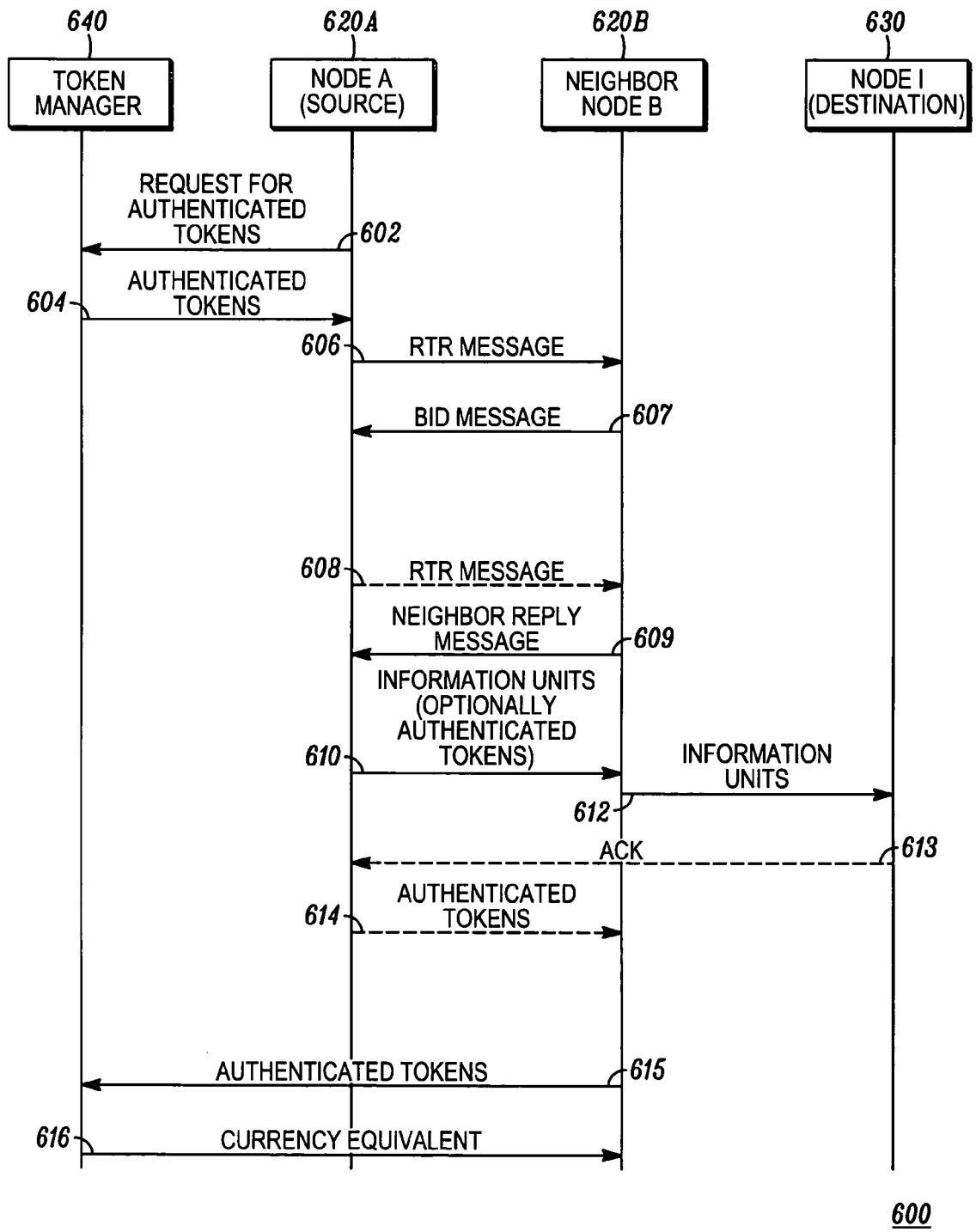
FIG. 6 is an exemplary call flow diagram in accordance with some embodiments of the invention.

FIG. 6 is an exemplary call flow diagram 600 in accordance with some embodiments of the invention.

At step 602, an originating node 620A which wants to transmit information units (e.g., data or signaling information) in an ad hoc network transmits a request for authenticated tokens to a token manager 640. This request is typically accompanied with some form of payment such as a debit or credit card number to pay for the authenticated tokens. At step 604, the token manager 640 can then transmit the authenticated tokens to the originating node 620A.

Figure 7:
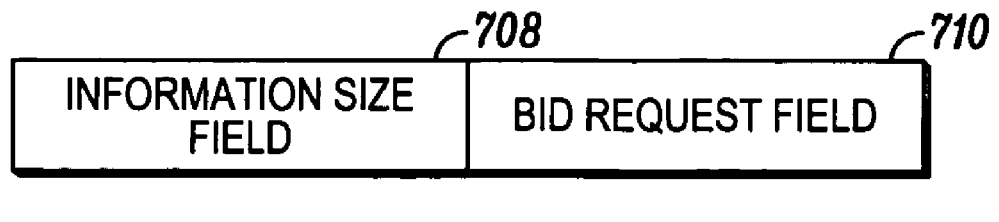
FIG. 7 is a request-to-route (RTR) message in accordance with some embodiments of the invention.

At step 606, the originating node 620A can transmit a request-to-route (RTR) message to its neighbor nodes in its "routing path" which in this case is assumed to be node B 620B. The RTR message notifies the neighbor node(s) that the node wants to transmit a given quantity of the information and serves as a mechanism for the node to solicit offers from neighbor nodes to route the given quantity of the information the node wants to transmit. For example, the RTR message can include a number of information units the originating node 620A wants to transmit and a bid request field. The bid request filed solicits a bid message from the neighbor node. FIG. 7 is a request-to-route (RTR) message in accordance with some embodiments of the invention. In this implementation, the RTR message 706 includes an information size field 708 which specifies the number of information units to be relayed, and a bid request field 710 which can include, for example, a request to submit a bid (e.g., a number of authenticated tokens requested in exchange for routing the IUs).

In response to the RTR message, node B 620B can transmit a bid message at step 607 which indicates a number of authenticated tokens node B 620B requests as compensation for relaying/routing the number of information units. If the originating node 620A deems the bid message acceptable, the process skips forward to step 609. On the other hand, if the originating node 620A does not deem the bid message as being acceptable, then the process advances to step 608 where the originating node 620A can transmit a second request-to-route (RTR) message to its neighbor node B 620B. It should be appreciated that new nodes could become neighbor nodes during the negotiation process. The second RTR message can include a number of information units the originating node 620A wants to transmit as well as a CFR field specifying a second number of authenticated tokens the originating node 620A is willing to pay neighbor node B 620B as compensation for routing the number of information units.

In the event only one neighbor node responds to the RTR message, the node may undergo a negotiation process whereby the node receives the bid from the neighbor node, rejects the bid and submits a new RTR message which includes a compensation-for-routing (CFR) field indicating the number of the authenticated tokens the node will offer in exchange for transmitting the information.

In this example, it is assumed that the neighbor node 620B is willing to relay the number of information units in exchange for the second number of authenticated tokens proposed by the originating node 620A. At step 609 the neighbor node B 620B can transmit a neighbor reply message indicating that neighbor node B 620B will relay the number of information units.

In response to the neighbor reply message, at step 610, the originating node 620A can transmit the number information units to the neighbor node B 620B and optionally the number of authenticated tokens. Alternatively, the originating node 620A can wait until it receives an acknowledgment (ACK) message from the destination node 630 at step 613 before transmitting the number of authenticated tokens. The acknowledgment (ACK) message confirms that the destination node 630 received the IUs (e.g., that the neighbor node 620B relayed the IUs to the destination node 630).

At step 612, the neighbor node 620B can transmit or relay the number information units to the destination node 630. At step 613, the originating node 620A receives an acknowledgment (ACK) message from the destination node 630. The acknowledgment (ACK) message confirms that the destination node 630 received the IUs (e.g., that the neighbor node 620B relayed the IUs to the destination node 630). In response to the ACK message, at step 614, the originating node 620A can transmit the number of authenticated tokens to the neighbor node 620B.

At step 615, the neighbor node B 620B can submit the second number of authenticated tokens, which it received in exchange for routing the number of information units, to the token manager 640. At step 616, the token manager 640 can transmit a currency equivalent credit to the neighbor node B 620B which the neighbor node B 620B can later convert to cash.

Figure 8:
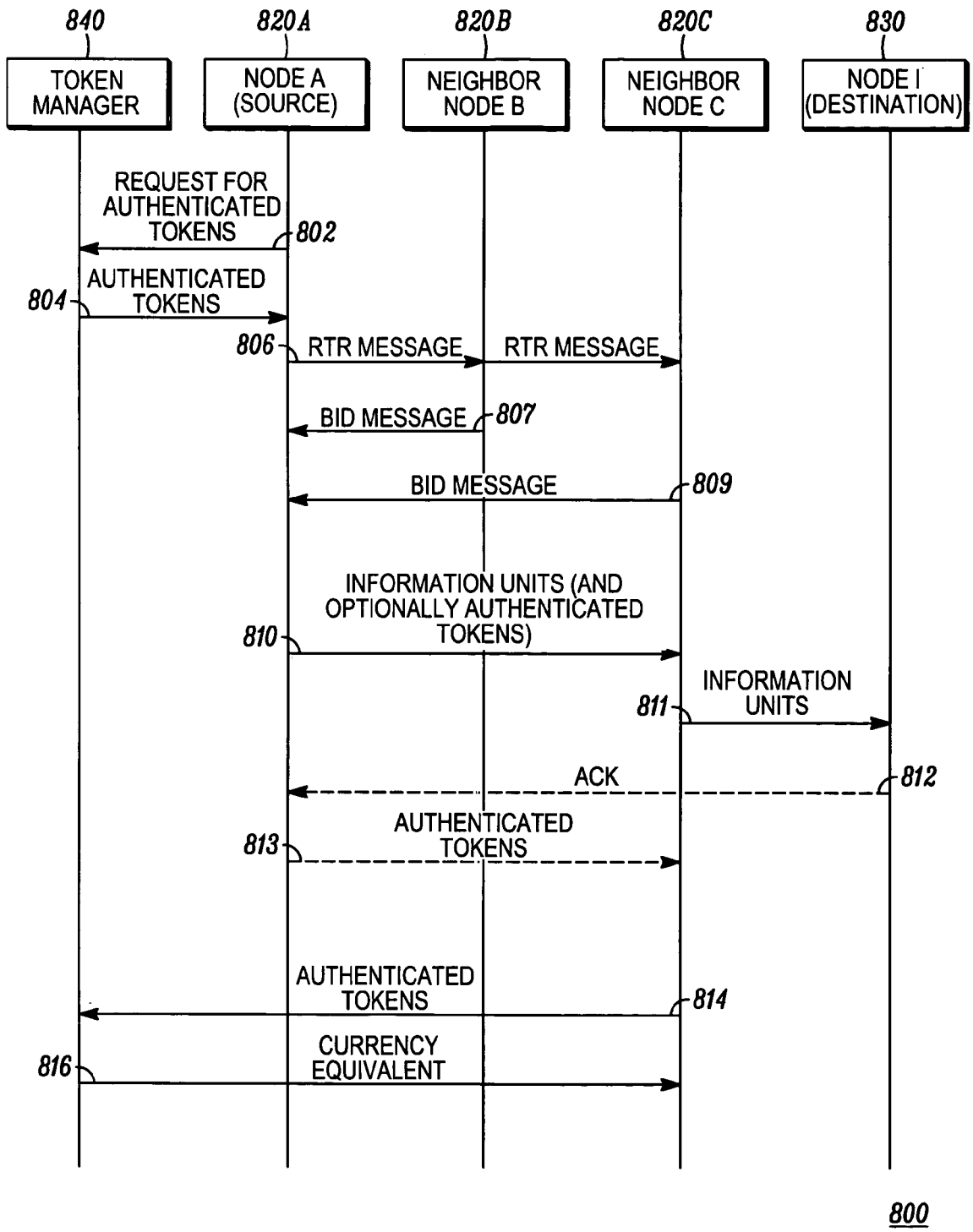
FIG. 8 is an exemplary call flow diagram in accordance with some embodiments of the invention.

FIG. 8 is an exemplary call flow diagram 800 in accordance with some embodiments of the invention.

At step 802, an originating node 820A which wants to transmit information units in an ad hoc network transmits a request for authenticated tokens to a token manager 840. This request is typically accompanied with some form of payment such as a debit or credit card number to pay for the authenticated tokens. At step 804, the token manager 840 can then transmit the authenticated tokens to the originating node 820A.

At step 806, the originating node 820A can transmit a request-to-route (RTR) message to its neighbor nodes which in this example are node B 840B and node C 820C. The RTR message can include a number of information units the originating node 820A wants to transmit, and can have a format as shown in FIG. 7.

If more than one routing node is a candidate to perform the routing function, then the routing nodes can submit "bids" to compete for the right to serve as the router of the information and receive the authenticated tokens. For example, if a node wants to route 50 bytes of information, then the node will transmit a request-to-route (RTR) offer message to its neighbor nodes advertising the offer with an information size field specifying 50 bytes of the information to be routed, and optionally a compensation-for-routing (CFR) field indicating the number of the authenticated tokens being offered in exchange for transmitting the information. For instance, if the node is willing to pay 50 authenticated tokens in exchange for routing the 50 bytes of information, the CFR field would indicate that 50 authenticated tokens being offered in exchange for transmitting the information.

In this example, in response to the RTR message, node B 840B and node C 820C can transmit bid messages at steps 807, 809 which indicate a number of authenticated tokens the node B 840B and node C 820C would like in exchange for routing the number of information units. Similarly, in FIG. 8, if neighbor node B 840B and node C 820C each represent a plurality of intermediate nodes in different routing paths between Node A (Source) 820A and Node I (Destination) 830 (as opposed to single intermediate nodes), the bid messages can represent the aggregate or total number of tokens requested by the nodes in the different routing paths, and can be used by Node A (Source) 820A to select a particular one of the different routing paths (e.g., the path requesting the lowest number of authenticated tokens). In either case, if the originating node 820A deems one of the bid messages acceptable, the process skips forward to step 810.

In this example, it is assumed that the bid message from neighbor node 820C requests/proposes the lowest number of authenticated tokens and therefore that the originating node 820A selects neighbor node 820C to relay the number of information in exchange for the number of authenticated tokens proposed by the originating node 820A. In response to the neighbor reply message, at step 810, the originating node 820A can transmit the number information units to the neighbor node 820C and optionally the number of authenticated tokens. Alternatively, the originating node 820A can wait until it receives an acknowledgment (ACK) message from the destination node 830 at step 812 before transmitting the number of authenticated tokens. The acknowledgment (ACK) message confirms that the destination node 830 received the IUs (e.g., that the neighbor node 820C relayed the IUs to the destination node 830).

At step 811, the neighbor node 820C can transmit or relay the number information units to the destination node 830. At step 812, the originating node 820A receives an acknowledgment (ACK) message from the destination node 830. The acknowledgment (ACK) message confirms that the destination node 830 received the IUs (e.g., that the neighbor node 820C relayed the IUs to the destination node 830). In response to the ACK message, at step 813, the originating node 820A can transmit the number of authenticated tokens to the neighbor node 820C.

At step 814, the neighbor node 820C can submit the second number of authenticated tokens, which it received in exchange for routing the number of information units, to the token manager 840. At step 816, the token manager 840 can transmit a currency equivalent credit to the neighbor node 820C which the neighbor node 820C can later convert to cash.

Figure 9:
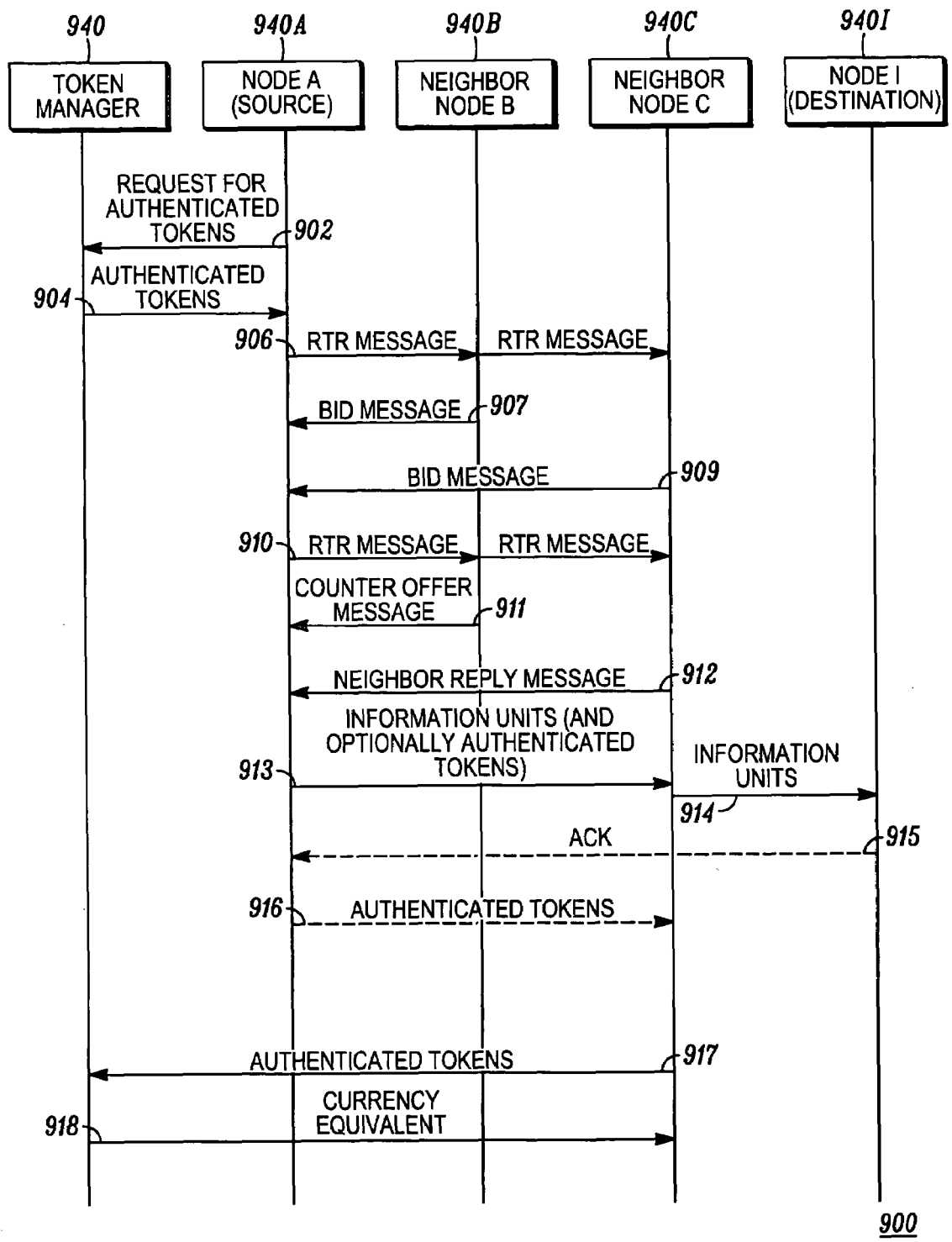
FIG. 9 is an exemplary call flow diagram in accordance with some embodiments of the invention.

FIG. 9 is an exemplary call flow diagram 900 in accordance with some embodiments of the invention.

At step 902, an originating node 920A which wants to transmit information units in an ad hoc network transmits a request for authenticated tokens to a token manager 940. This request is typically accompanied with some form of payment such as a debit or credit card number to pay for the authenticated tokens. At step 904, the token manager 940 can then transmit the authenticated tokens to the originating node 920A. At step 906, the originating node 920A can transmit a request-to-route (RTR) message to its neighbor nodes which in this case are node B 940B and node C 920C. The RTR message can include a number of information units the originating node 920A wants to transmit.

In response to the first RTR message, the neighbor node(s) transmit "bids" messages which indicate the number of authenticated tokens they require to route the information.

In response to the RTR message, node B 940B and node C 920C can transmit bid messages at steps 907, 909 which indicate a number of authenticated tokens the node B 940B and node C 920C would like in exchange for routing the number of information units. If any of the bid messages are acceptable to the node (e.g., the node 940A is willing to give the number of tokens specified by the bid message), then node then transmits an acceptance message to one of the neighbor nodes which indicates that it accepts its bid. If the originating node 920A deems one of the bid messages acceptable, the process skips forward to step 913. By contrast, if none of the bid messages are acceptable (e.g., all of the neighbor nodes respond with "bids" which indicate a number of authenticated tokens which is too high), then the node 920A may undergo a negotiation process whereby the node 920A transmits a rejection message rejecting all of the bids.

Thus, if the originating node 920A does not deem one of the bid messages as being acceptable, then the process advances to step 910 where the originating node 920A can transmit a second request-to-route (RTR) message to its neighbor nodes which in this case are still node B 920B and node C 920C. New nodes could become neighbor nodes during the negotiation process. The second RTR message can include a number of information units the originating node 920A wants to transmit as well as a second number of authenticated tokens the originating node 920A is willing to pay for one of the neighbors.

In response to the new RTR message, the neighbor nodes willing to route the given quantity of the information can transmit a new bid message. In this example, it is assumed that the neighbor node 920B is not willing to relay the number of information units in exchange for the number of authenticated tokens proposed by the originating node 920A. As such, at step 911, the neighbor node 920B can transmit a counteroffer message indicating that that neighbor node 920B will relay the number of information units for a different number of authenticated tokens. By contrast, in this example, it is assumed that the neighbor node 920C is willing to relay the number of information units in exchange for the number of authenticated tokens proposed by the originating node 920A, and at step 912 the neighbor node 920C can transmit a neighbor reply message indicating that that neighbor node 920C will relay the number of information units. In response to the neighbor reply message, at step 913, the originating node 920A can transmit the number information units to the neighbor node 920C and optionally the number of authenticated tokens. Alternatively, the originating node 920A can wait until it receives an acknowledgment (ACK) message from the destination node 930 at step 915 before transmitting the number of authenticated tokens. The acknowledgment (ACK) message confirms that the destination node 930 received the IUs (e.g., that the neighbor node 920C relayed the IUs to the destination node 930).

At step 914, the neighbor node 920C can transmit or relay the number information units to the destination node 930. At step 915, the originating node 920A receives an acknowledgment (ACK) message from the destination node 930. The acknowledgment (ACK) message confirms that the destination node 930 received the IUs (e.g., that the neighbor node 920C relayed the IUs to the destination node 930). In response to the ACK message, at step 916, the originating node 920A can transmit the number of authenticated tokens to the neighbor node 920C.

At step 917, the neighbor node 920C can submit the second number of authenticated tokens, which it received in exchange for routing the number of information units, to the token manager 940. At step 918, the token manager 940 can transmit a currency equivalent credit to the neighbor node 920C which the neighbor node 920C can later convert to cash.

In the foregoing specification, specific embodiments of the present invention have been described. However, one of ordinary skill in the art appreciates that various modifications and changes can be made without departing from the scope of the present invention as set forth in the claims below. While aspects of the present invention have been described in the context of a wireless ad hoc network to show one possible application, it should be appreciated that the general principles could be applied to internetworking in other types of peer-to-peer networks where it is desirable to provide an incentive for routing information between peers and decentralized control.

Accordingly, the specification and figures are to be regarded in an illustrative rather than a restrictive sense, and all such modifications are intended to be included within the scope of present invention. For example, it should be appreciated that in some implementations it may be desirable that a destination node sends authenticated tokens to a source node and that the source may convert these into a currency equivalent. In another implementation, the token exchange can be based on a shared wallet concept, where a group of users who are part of a community can share the tokens and credits.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for encouraging information routing in a network comprising a plurality of nodes, the method comprising:
   transmitting a first request-to-route (RTR) message from a first node to plurality of neighbor nodes in a routing path from the first node to a destination, wherein the RTR message comprises an indication specifying a number of information units (IUs);
   transmitting an offer message from each of the plurality of neighbor nodes to the first node which indicates that the neighbor node will route the number of information units (IUs) in exchange for an associated quantity of authenticated tokens;
   selecting one of the plurality of neighbor nodes based on comparing each of the associated quantity of authenticated tokens;
   transmitting the information units (IUs) and the quantity of authenticated tokens offered by the selected neighbor node to the selected neighbor node; and
   converting the transmitted quantity of authenticated tokens into a tradable entity.

2. A method according to claim 1, wherein the first request-to-route (RTR) message comprises a routing transaction proposal comprising an information size field comprising the number of information units (IUs) to be routed, and a compensation-for-routing (CFR) field comprising a third number of authenticated tokens to be given by the first node to one of the neighbor nodes in exchange for routing the number of information units (IUs).

3. A method according to claim 1, wherein the transmitted quantity of authenticated tokens provide compensation to the selected neighbor node for routing the information units.

4. A method according to claim 3, wherein the third number of authenticated tokens is equal to the second number of authenticated tokens agreed upon before transmission of the first RTR message.

5. A method according to claim 1, and further comprising when none of the offers are acceptable to the first node:
   negotiating another quantity of tokens to be exchanged for routing the number of information units (IUs) between the first node and the plurality of neighbor nodes.

6. A method according to claim 5, wherein negotiating the another quantity of tokens comprises:
   transmitting a counteroffer message from the first node to the plurality of neighbor nodes, wherein the counteroffer message specifies another quantity of authenticated tokens to be provided by the first node to the neighbor node in exchange for routing the number of information units (IUs).

7. A method according to claim 6, wherein negotiating the another quantity of tokens further comprises:
transmitting another counteroffer message from each of the plurality of the neighbor nodes to the first node, wherein each of the another counteroffer messages specify requests for other numbers of authenticated tokens to be provided by the first node to the corresponding neighbor node in exchange for routing the number of information units (IUs).

8. A method according to claim 1, further comprising:
transmitting a second request-to-route (RTR) message from the first node in response to the offer messages, wherein the second RTR message comprises a second routing transaction proposal comprising an indication specifying a another quantity of authenticated tokens to be exchanged for routing the number of information units (IUs).

9. A method according to claim 1, further comprising:
transmitting a bid message from at least some of the neighbor nodes to the first node in response to the first RTR message, wherein each bid message comprises a proposed number of authenticated tokens requested by the neighbor node in exchange for routing the number of information units;
evaluating the bid messages at the first node; and
selecting the one of the neighbor nodes having a bid message that proposes the lowest proposed number of authenticated tokens to route the number of information units.

10. A method according to claim 1, the method further comprising:
obtaining authenticated tokens at the first node from a token manager configured to provide authenticated tokens to the nodes.

11. A method according to claim 10, wherein obtaining authenticated tokens at the first node from a token manager configured to provide authenticated tokens to the nodes, comprises:
purchasing authenticated tokens at the first node from a token manager configured to provide authenticated tokens to the nodes, wherein the first node offers some of the authenticated tokens to neighbor nodes to provide an incentive to the neighbor nodes to route the number of information units.

12. A method according to claim 1, wherein converting the second number of the authenticated tokens into a tradable entity, comprises:
submitting the second number of authenticated tokens obtained by the neighbor node to an exchange terminal; and
converting the second number of the authenticated tokens into a currency equivalent at an exchange terminal.

13. A method according to claim 12, wherein the exchange terminal is implemented in the token manager.

14. A method according to claim 12, wherein the currency equivalent comprises currency.

15. A method according to claim 1, the method further comprising:
performing a routing function by transmitting the number of information units (IUs) received by the neighbor node, from the first node, to a third node.

16. A node communicating in a network comprising a plurality of nodes, the node comprising:
a processor configured to determine neighbor nodes in a routing path to a destination based on a routing table associated with the node;
a memory configured to store one or more authenticated tokens;
a transmitter configured to transmit a first request-to-route (RTR) message from the first node to the neighbor nodes, wherein the RTR message comprises an indication specifying a number of information units (IUs); and
a receiver configured to receive a neighbor offer message from each of the neighbor nodes which indicates that the neighbor node will route the number of information units (IUs) in exchange for an associated quantity of authenticated tokens,
wherein the processor is further configured to select one of the plurality of neighbor nodes based on comparing each of the associated quantity of authenticated tokens;
wherein the transmitter is configured to transmit the information units (IUs) and the quantity of authenticated tokens the selected neighbor node, wherein the transmitted quantity of authenticated tokens can be converted into a tradable entity and provide compensation to the selected neighbor node for routing the number of information units.

17. A node according to claim 16, wherein the first request-to-route (RTR) message comprises a routing transaction proposal comprising an information size field comprising the number of information units (IUs) to be routed, and a compensation-for-routing (CFR) field comprising a third number of authenticated tokens to be given by the first node to one of the neighbor nodes in exchange for routing the number of information units (IUs).

18. A node according to claim 17, wherein the third number of authenticated tokens is equal to the second number of authenticated tokens agreed before transmission of the first RTR message.

19. A node according to claim 17, wherein the processor further comprises:
a negotiation module configured to negotiate another quantity of tokens to be exchanged for routing the number of information units (IUs) between the node and the plurality of neighbor nodes.

20. A node according to claim 19, wherein the transmitter is configured to transmit a counteroffer message to the neighbor nodes, wherein the counteroffer message specifies a request for another quantity of authenticated tokens to be provided by the node to the neighbor node in exchange for routing the number of information units (IUs).

21. A node according to claim 20, wherein the receiver is configured to receive another counteroffer message from each of the plurality of the neighbor nodes, wherein each of the another counteroffer messages specify requests for other numbers of authenticated tokens to be provided by the node to the corresponding neighbor node in exchange for routing the number of information units (IUs).

22. A node according to claim 16, wherein the transmitter is configured to transmit a second request-to-route (RTR) message in response to the offer messages, wherein the second RTR message comprises a second routing transaction proposal comprising an indication specifying another quantity of authenticated tokens to be exchanged for routing the number of information units (IUs).

23. A node according to claim 16, wherein the receiver is configured to receive bid messages from at least some of the neighbor nodes in response to the first RTR message, wherein each bid message comprises a proposed number of authenticated tokens requested by the neighbor node in exchange for routing the number of information units,
wherein the processor is configured to evaluate the bid messages received by the receiver, and to select the one of the neighbor nodes having a bid message that proposes the lowest proposed number of authenticated tokens to route the number of information units.

24. A node according to claim 16, wherein the node is configured to purchase the first number of authenticated tokens from a token manager configured to provide the first number of authenticated tokens, wherein the first node offers some of the authenticated tokens to neighbor nodes to provide an incentive to the neighbor nodes to route the number of information units.

25. A network comprising a plurality of nodes, the network comprising:
a first node configured to transmit a number of information units (IUs);
a destination configured to receive the number of information units (IUs) from the first node;
a token manager configured to provide authenticated tokens to the nodes and configured to provide a first number of authenticated tokens to the first node; and
a plurality of neighbor nodes;
wherein the first node is configured to determine neighbor nodes in a routing path to a destination based on a routing table associated with the first node, to store the first number of authenticated tokens, to transmit a first request-to-route (RTR) message to the neighbor nodes, wherein the RTR message comprises an indication specifying the number of information units (IUs), to receive a neighbor offer message from each of the neighbor nodes which indicates that the neighbor node will route the number of information units (IUs) in exchange for an associated quantity of authenticated tokens, to select one of the neighbor nodes based on comparing each of the associated quantities of authenticated tokens, and to transmit the quantity of authenticated tokens offered by the selected neighbor node to the selected neighbor node, wherein the transmitted quantity of authenticated tokens is convertible into a tradable entity.

26. A network according to claim 25, wherein the first request-to-route (RTR) message comprises a routing transaction proposal comprising an information size field comprising the number of information units (IUs) to be routed, and a compensation-for-routing (CFR) field comprising a third number of authenticated tokens to be given by the first node to one of the neighbor nodes in exchange for routing the number of information units (IUs).

27. A network according to claim 25, wherein the transmitted quantity of authenticated tokens provide compensation to the selected neighbor node for routing the number of information units, wherein the selected neighbor node is configured to transmit the number of information units (IUs) received from the first node to a third node.

28. A network according to claim 27, wherein the third number of authenticated tokens is equal to the second number of authenticated tokens agreed upon before transmission of the first RTR message.

29. A network according to claim 25, wherein none of the offers are acceptable to the first node, and wherein the first node and the neighbor nodes negotiate another quantity of tokens to be exchanged for routing the number of information units (IUs).

30. A network according to claim 29, wherein the first node transmits a counteroffer message to the plurality of neighbor nodes, wherein the counteroffer message specifies another quantity of authenticated tokens to be provided by the first node to the neighbor node in exchange for routing the number of information units (IUs).

31. A network according to claim 30, wherein a plurality of the neighbor nodes each transmit a another counteroffer message to the first node, wherein each of the counteroffer messages specify requests for other numbers of authenticated tokens to be provided by the first node to the corresponding neighbor node in exchange for routing the number of information units (IUs).

32. A network according to claim 31, wherein the first node is configured to transmit a second request-to-route (RTR) message in response to the counteroffer messages, wherein the second RTR message comprises a second routing transaction proposal comprising an indication specifying a fifth number of authenticated tokens to be exchanged for routing the number of information units (IUs).

33. A network according to claim 25, wherein each of the neighbor nodes is configured transmit a bid message to the first node in response to the first RTR message, wherein each bid message comprises a proposed number of authenticated tokens requested by the neighbor node in exchange for routing the number of information units, and
wherein the neighbor node is configured to evaluate the bid messages and to select the one of the neighbor nodes having a bid message that proposes the lowest proposed number of authenticated tokens to route the number of information units.

34. A network according to claim 33, wherein the first node purchases the authenticated tokens from the token manager, wherein the first node offers some of the authenticated tokens to neighbor nodes to provide an incentive to the neighbor nodes to route the number of information units.

35. A network according to claim 25, further comprising:
an exchange terminal, wherein the tradable entity comprises a currency provided by the exchange terminal.

* * * * *

UNITED STATES PATENT AND TRADEMARK OFFICE
CERTIFICATE OF CORRECTION

Page 1 of 1

PATENT NO.         : 7,710,932 B2
APPLICATION NO.    : 11/302866
DATED              : May 4, 2010
INVENTOR(S)        : Muthuswamy et al.

It is certified that error appears in the above-identified patent and that said Letters Patent is hereby corrected as shown below:

In Column 13, Line 15, delete "complete. the" and insert -- complete, the --, therefor.

IN THE CLAIMS

In Column 18, Line 22, in Claim 1, delete "to plurality" and insert -- to a plurality --, therefor.

In Column 18, Line 55, in Claim 5, delete "claim 1, and" and insert -- claim 1, --, therefor.

In Column 19, Line 2, in Claim 7, delete "tokns" and insert -- tokens, --, therefor.

In Column 20, Line 17, in Claim 16, delete "tokens the" and insert -- tokens to the --, therefor.

In Column 22, Line 32, in Claim 33, delete "configured transmit" and insert -- configured to transmit --, therefor.

Signed and Sealed this
First Day of May, 2012

David J. Kappos
*Director of the United States Patent and Trademark Office*